US012652518B2

(12) United States Patent
Sartori et al.

(10) Patent No.: US 12,652,518 B2
(45) Date of Patent: *Jun. 9, 2026

(54) METHOD FOR AVOIDING COLLISIONS BETWEEN OPEN DISCOVERY AND CELLULAR RESOURCE

(71) Applicant: Futurewei Technologies, Inc., Addison, TX (US)

(72) Inventors: Philippe Sartori, Plainfield, IL (US); Vipul Desai, Palatine, IL (US); Hossein Bagheri, Arlington Heights, IL (US); Anthony C.K. Soong, Plano, TX (US)

(73) Assignee: FutureWei Technologies, Inc., Addison, TX (US)

( * ) Notice: Subject to any disclaimer, the term of this patent is extended or adjusted under 35 U.S.C. 154(b) by 270 days.

This patent is subject to a terminal disclaimer.

(21) Appl. No.: 18/486,149

(22) Filed: Oct. 12, 2023

(65) Prior Publication Data

US 2024/0040360 A1      Feb. 1, 2024

Related U.S. Application Data

(63) Continuation of application No. 16/926,409, filed on Jul. 10, 2020, now Pat. No. 11,818,792, which is a continuation of application No. 15/620,517, filed on Jun. 12, 2017, now Pat. No. 10,715,991, which is a continuation of application No. 14/508,822, filed on Oct. 7, 2014, now Pat. No. 9,749,833.

(60) Provisional application No. 61/888,425, filed on Oct. 8, 2013.

(51) Int. Cl.
*H04W 4/00* (2018.01)
*H04W 8/00* (2009.01)
*H04W 72/566* (2023.01)

(52) U.S. Cl.
CPC ......... *H04W 8/005* (2013.01); *H04W 72/569* (2023.01)

(58) Field of Classification Search
CPC . H04W 8/005; H04W 72/1242; H04W 72/12; H04W 8/00; H04W 74/08; H04W 72/569; H04W 72/566
USPC ......................................................... 370/329
See application file for complete search history.

(56) References Cited

U.S. PATENT DOCUMENTS

| | | | | |
|---|---|---|---|---|
| 8,848,700 B2 * | 9/2014 | Ahn | ....................... | H04W 72/52 |
| | | | | 370/252 |
| 9,042,938 B2 * | 5/2015 | Nimbalker | ............ | H04L 1/1822 |
| | | | | 455/550.1 |
| 9,154,267 B2 * | 10/2015 | He | ........................ | H04L 1/0026 |
| 9,185,697 B2 * | 11/2015 | Kuchibhotla | ........... | H04W 4/90 |

(Continued)

*Primary Examiner* — Marceau Milord

(57) ABSTRACT

A device is configured to perform a method of wireless communication in a wireless communication network. The method includes receiving, from a communications controller, a device-to-device (D2D) subframe configuration to communicate with one or more second wireless devices, the subframe configuration indicating one or more subframes in which to transmit a D2D signal or receive one or more D2D signals. The method also includes receiving, from the communications controller, scheduling information to transmit a first signal to the communications controller on a subframe indicated by the D2D subframe configuration. The method further includes prioritizing the transmission of the first signal over a transmission of the D2D signal or a reception of the one or more D2D signals, and transmitting the first signal.

15 Claims, 5 Drawing Sheets

(56) References Cited

U.S. PATENT DOCUMENTS

| | | | |
|---|---|---|---|
| 9,749,833 B2 * | 8/2017 | Sartori | H04W 8/005 |
| 9,775,135 B2 * | 9/2017 | Seo | H04W 72/20 |
| 10,715,991 B2 * | 7/2020 | Sartori | H04W 8/005 |
| 11,818,792 B2 * | 11/2023 | Sartori | H04W 8/005 |
| 2013/0083779 A1 * | 4/2013 | Ahn | H04W 72/04 |
| | | | 370/336 |
| 2014/0003262 A1 * | 1/2014 | He | H04W 52/0245 |
| | | | 370/252 |
| 2014/0038653 A1 * | 2/2014 | Mildh | H04W 16/14 |
| | | | 455/501 |
| 2015/0098422 A1 * | 4/2015 | Sartori | H04W 72/569 |
| | | | 370/329 |
| 2017/0280312 A1 * | 9/2017 | Sartori | H04W 72/569 |

* cited by examiner

Subframe

METHOD FOR AVOIDING COLLISIONS BETWEEN OPEN DISCOVERY AND CELLULAR RESOURCE

CROSS-REFERENCE TO RELATED APPLICATIONS

This application is a continuation of U.S. Non-Provisional application Ser. No. 16/926,409 (Now U.S. patent Ser. No. 11/818,792B2), filed on Jul. 10, 2020 which is a continuation application of U.S. Non-Provisional application Ser. No. 15/620,517, filed on Jun. 12, 2017 which is a continuation application of U.S. Non-Provisional application Ser. No. 14/508,822, filed on Oct. 7, 2014, (now U.S. Pat. No. 9,749,833, issued on Aug. 29, 2017) which claims the benefit of U.S. Provisional Application No. 61/888,425 filed on Oct. 8, 2013, all of which applications are hereby incorporated herein by reference in their entireties.

This application is related to U.S. patent application Ser. No. 15/464,994, entitled "OPERATING STATES FOR D2D DISCOVERY" and filed on Mar. 21, 2017, which is hereby incorporated herein by reference in its entirety.

TECHNICAL FIELD

The present disclosure relates generally to digital communications, and more particularly, to a system and method for transmission and reception of device-to-device signals in a communications system.

BACKGROUND

Systems that operate using device-to-device (D2D) standards have the potential to provide new services, improve system throughput, and offer a better user experience. The application of D2D technology is under investigation in 3GPP (3rd Generation Partnership Project). Potential use cases for D2D have been identified by 3GPP participants. Some uses cases considered for the LTE (Long Term Evolution) standard are associated with a variety of devices, including user equipment (UE), cell phones, smart phones, and network equipment, e.g., communications controllers, base stations, enhanced nodeB (eNB), and the like.

SUMMARY

According to one embodiment, there is provided a method of wireless communication in a wireless communication network. The method includes receiving, from a communications controller, a device-to-device (D2D) subframe configuration to communicate with one or more second wireless devices, the subframe configuration indicating one or more subframes in which to transmit a D2D signal or receive one or more D2D signals. The method also includes receiving, from the communications controller, scheduling information to transmit a first signal to the communications controller on a subframe indicated by the D2D subframe configuration. The method further includes prioritizing the transmission of the first signal over a transmission of the D2D signal or a reception of the one or more D2D signals, and transmitting the first signal.

According to another embodiment, there is provided a wireless device capable of communication in a wireless communication network. The device includes at least one antenna configured to transmit and receive signals, and at least one processor. The at least one processor is configured to control the device to receive, from a communications controller, a device-to-device (D2D) subframe configuration to communicate with one or more second wireless devices, the subframe configuration indicating one or more subframes in which to transmit a D2D signal or receive one or more D2D signals; receive, from the communications controller, scheduling information to transmit a first signal to the communications controller on a subframe indicated by the D2D subframe configuration; prioritize the transmission of the first signal over a transmission of the D2D signal or a reception of the one or more D2D signals; and transmit the first signal over the at least one antenna.

According to yet another embodiment, there is provided a non-transitory computer readable medium embodying a computer program. The computer program includes computer readable program code for receiving, from a communications controller, a device-to-device (D2D) subframe configuration to communicate with one or more second wireless devices, the subframe configuration indicating one or more subframes in which to transmit a D2D signal or receive one or more D2D signals; receiving, from the communications controller, scheduling information to transmit a first signal to the communications controller on a subframe indicated by the D2D subframe configuration; prioritizing the transmission of the first signal over a transmission of the D2D signal or a reception of the one or more D2D signals; and transmitting the first signal.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION OF ILLUSTRATIVE EMBODIMENTS

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the disclosure may be implemented in any type of suitably arranged device or system.

The following documents and standards descriptions are hereby incorporated into this disclosure as if fully set forth herein:

3GPP TR 22.803, version 12.0.0, December 2012 (hereinafter "REF1"); R1-133803, "Final Report of 3GPP TSG RAN WG1 #73 v1.0.0", Fukuoka, Japan, May 20-24, 2013, MCC Support (hereinafter "REF2"); 3GPP TR 36.211, version 11.3.0, September 2012 (hereinafter "REF3"); 3GPP TR 36.213, version 11.5.0, September 2013 (hereinafter "REF4"); and 3GPP TR 36.212, version 11.1.0, December 2012 (hereinafter "REF5").

Figure 1:
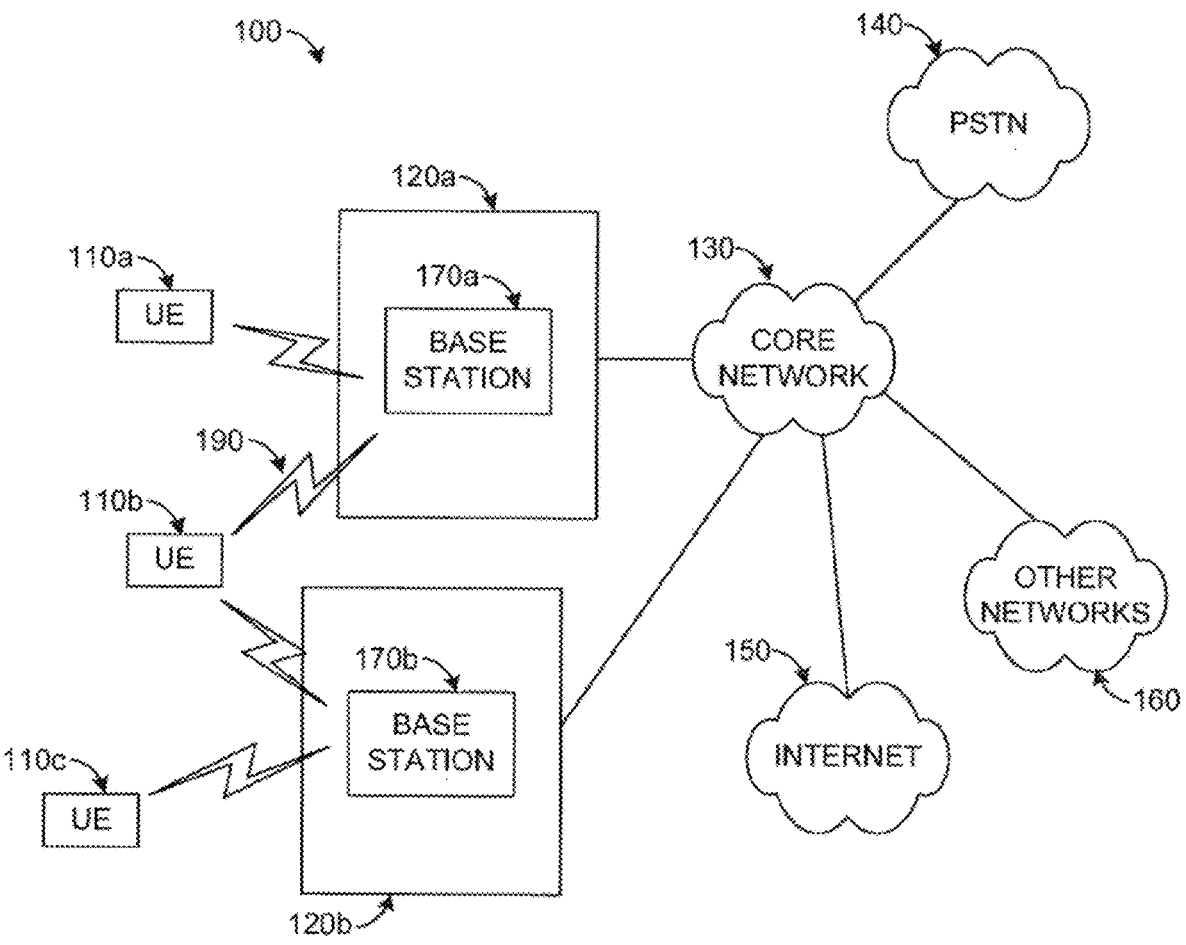
FIG. 1 illustrates an example communication system that may be used for implementing the devices and methods disclosed herein.

FIG. 1 illustrates an example communication system 100 that may be used for implementing the devices and methods disclosed herein. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 16o. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, a server, a switch, or any other suitable processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described herein. In particular embodiments, the base stations 170a-170b and UEs 110a-110c are configured to implement LTE, LTE-A, and/or LTE-B. Additionally, in accordance with this disclosure, one or more of the base stations 170a-170b and UEs 110a-110c are configured to communicate according to device-to-device (D2D) communication and discovery standards and principles. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

Figure 2A:
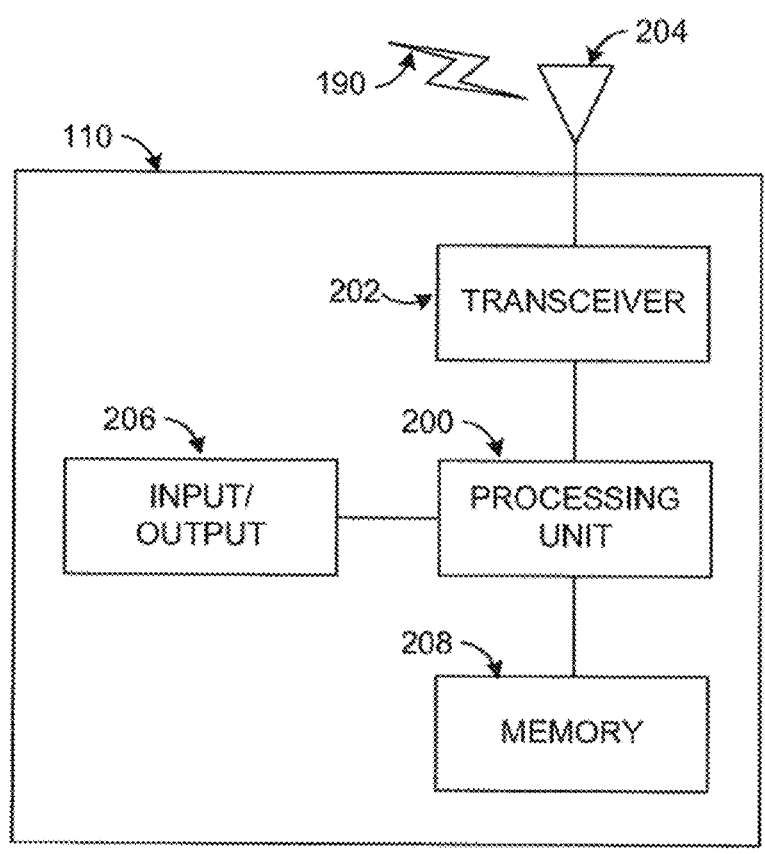
FIGS. 2A and 2B illustrate example devices that may be used for implementing the methods and teachings disclosed herein.
Figure 2B:
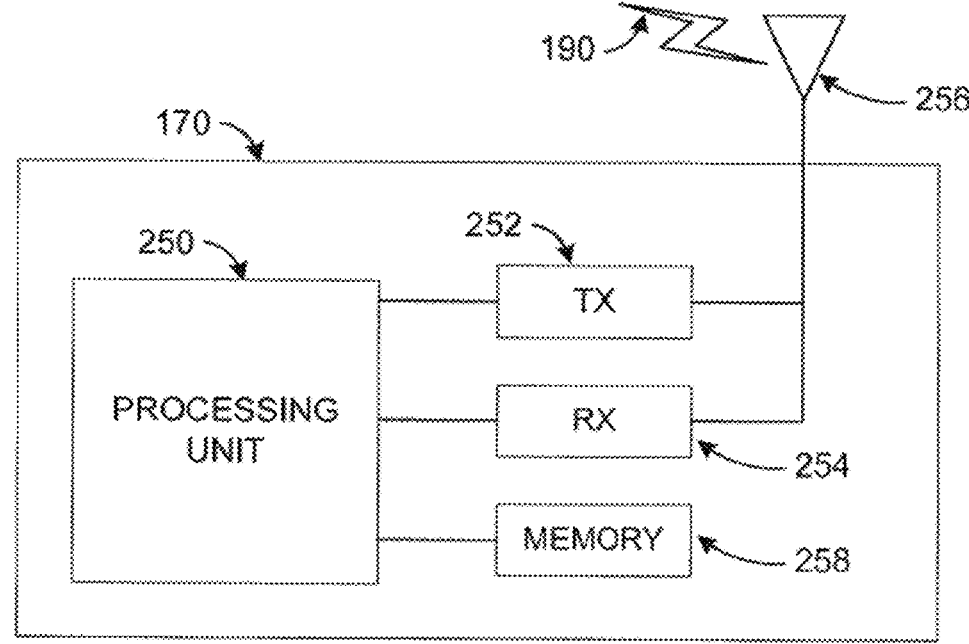

FIGS. 2A and 2B illustrate example devices that may be used for implementing the methods and teachings disclosed herein. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the D2D standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the D2D standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

In Version 11 of the LTE standard, a UE can have two radio resource control (RRC) states: RRC-Idle and RRC-Connected. These states were developed for communications between a communications controller (e.g., an eNB) and a UE.

Figure 3:
FIG. 3 depicts a state diagram illustrating radio resource control (RRC) states in a LTE Version 11 system.

To illustrate, FIG. 3 depicts a state diagram of the RRC states in a LTE Version 11 system. As shown in FIG. 3, the states are RRC-Idle and RRC-Connected. FIG. 3 also shows that the RRC-Connected state has two sub-states: Dormant and Active. For the sake of brevity, the "RRC-Idle state" is also sometimes referred to herein as the "idle state". Likewise, the "RRC-Connected state" is also sometimes referred to herein as the "connected state".

For D2D, two functions are envisioned: Communication and Discovery. These functions are now defined.

Communication: When performing a Communication function, a UE directly communicates with other UEs without the communication data passing through the eNB. A UE in D2D communication with another device is not precluded from performing cellular communication (i.e., exchanging data with another entity through the communications controller).

Discovery: When performing discovery, a UE both can discover and is discoverable. That is, a UE can attempt to discover neighboring UEs by receiving discovery signals, and can transmit discovery signals for other UEs to discover it.

In some environments, a UE may be in-coverage (IC) or out-of-coverage (OOC). When the UE is IC (i.e., in-network coverage), the UE can establish a link with an eNB. When the UE is OOC (i.e., out-of-network coverage), the UE cannot establish a link with an eNB. Typically, if a UE can receive synchronization signals, such as a primary synchronization signal (PSS), secondary synchronization signal (SSS), master information block (MIB), and system information block (SIB), the UE can be considered in-coverage (IC). Conversely, if the UE cannot receive such information, it is out-of-coverage (OOC).

Figure 4:
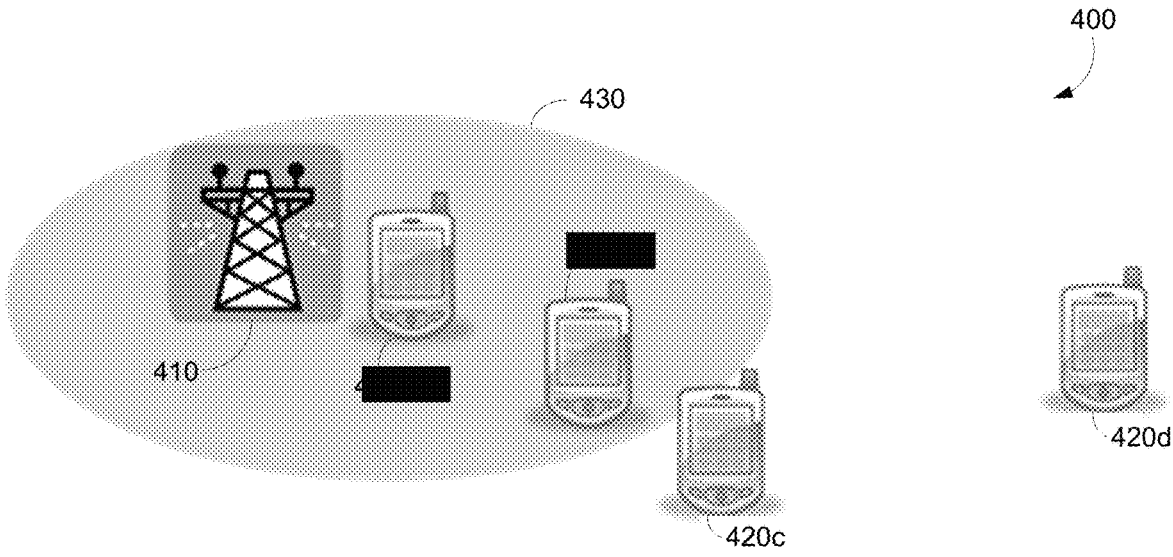
FIG. 4 illustrates examples of different coverage scenarios in a wireless communication system.

To illustrate, FIG. 4 depicts examples of different coverage scenarios in a wireless communication system. As shown in FIG. 4, the system 400 includes an eNB 410 and a plurality of devices represented by UEs 420a-42od. In certain embodiments, the eNB 410 may represent one or more of the base stations 170a-170b of FIG. 1, and the UEs 420a-42od may represent one or more of the UEs 110a-110c of FIG. 1. The eNB 410 controls communications within a coverage area 430. In the system 400, the UEs 420a-420b are in-network coverage, while the UE 42od may be considered out-of-network coverage. The UE 420c may be in partial network coverage due to its proximity to the coverage area 430 of the eNB 410.

During LTE standardization discussions, D2D discovery was categorized by two types, as indicated by the following text from REF2

"At least the following two types of discovery procedure are defined for the purpose of terminology definition for use in further discussions/studies (note that these definitions are intended only to aid clarity and not to limit the scope of the study):

> Type 1: a discovery procedure where resources for discovery signal transmission are allocated on a non UE specific basis
>
> Note: Resources can be for all UEs or group of UEs
>
> Type 2: a discovery procedure where resources for discovery signal transmission are allocated on a per UE specific basis
>
> Type 2A: Resources are allocated for each specific transmission instance of discovery signals
>
> Type 2B: Resources are semi-persistently allocated for discovery signal transmission."

Based on the current LTE definitions, UEs are either in RRC-Connected or RRC-Idle state with respect to a network. When a UE operates in the RRC-Idle state, the only signal the UE can transmit is the physical random access channel (PRACH). For all other transmissions, the UE enters the RRC-Connected state. Thus, under LTE Version 12, it is envisioned that devices participating in communication with each other are operating in the RRC-Connected state. Some of the functions of the UE during the RRC-Connected state include the following:

> RRC-Connected:
>
> UE has an E-UTRAN-RRC connection;
>
> UE has context in E-UTRAN;
>
> E-UTRAN knows the cell which the UE belongs to;
>
> Network can transmit and/or receive data to/from UE;
>
> Network controlled mobility (handover and inter-RAT cell change order to GERAN with NACC);
>
> Neighbor cell measurements;
>
> At PDCP/RLC/MAC level:
>
> UE can transmit and/or receive data to/from network;

UE monitors control signaling channel for shared data
channel to see if any transmission over the shared data
channel has been allocated to the UE;

UE also reports channel quality information and feedback
information to eNB;

DRX period can be configured according to UE activity
level for UE power saving and efficient resource utili-
zation. This is under control of the eNB.

In the RRC-Connected state, the UE maintains a commu-
nication link to the communications controller (e.g., an
eNB). The UE may transmit to the communications con-
troller, on the uplink (UL), control information on the
physical uplink control channel (PUCCH) or data/control
information on the physical uplink shared channel
(PUSCH). Control information can include different types of
information, including one or more of the following: an
acknowledgement/negative acknowledgement (ACK/
NACK, ACK/NAK, or A/N), scheduling request (SR), chan-
nel quality indicator (CQI), precoding matrix indicator
(PMI), and channel state information (CSI). The ACK/NAK
is generated in response to the reception of transmission of
data on the downlink (DL) from the communications con-
troller to the UE. More specifically, data sent on the physical
downlink shared channel (PDSCH) from the communica-
tions controller to the UE is typically acknowledged by the
UE. In this case, the acknowledgement includes an ACK or
a NAK generated by the UE and transmitted to the com-
munications controller.

In REF4, a procedure relating the transmission of the
ACK/NAK to the PDSCH is discussed. The procedure
specifies when the ACK/NAK is transmitted in terms of
subframes for time division duplex (TDD) and frequency
division duplex (FDD) configurations. In LTE, one subframe
is 1 msec in duration, and there are 10 subframes in a frame.
The subframes are numbered 0 to 9 within a frame.

Figure 5:
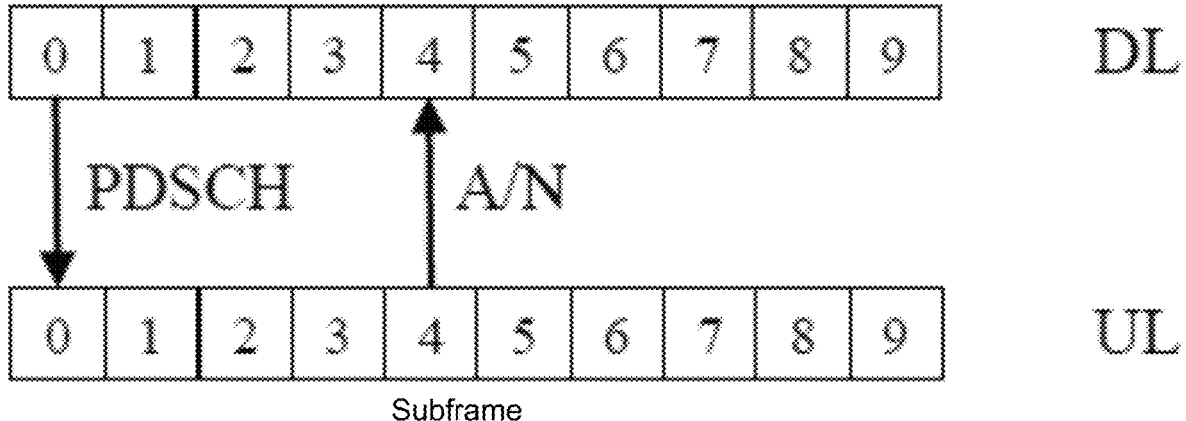
FIG. 5 illustrates an example of acknowledgement/negative acknowledgement (A/N) timing for a physical downlink shared channel (PDSCH) in a frequency division duplex (FDD) configuration.

For FDD, a PDSCH transmission in subframe k is
acknowledged by the UE in subframe k+4, where k is an
integer between 0 and 9. For example, FIG. 5 shows an
example timing diagram for an FDD configuration, in which
an acknowledgement is transmitted in subframe 4 in
response to a PDSCH transmission in subframe 0. The sum
k+4 is determined using modulo 1. Stated differently, if k is
less than 6, the sum k+4 is less than 10 and the ACK/NAK
is transmitted in the same frame. For k>6, the sum k+4 is
greater than or equal to 10 and the ACK/NAK is transmitted
in the next frame.

For TDD, a table such as Table 10.1.3.1-1 in REF4 shows
the offset as a function of the subframe number and the
UL-DL configuration, as described in Table 4.2-2 of REF3.
In general, the minimum offset is 4. It is noted that Table
10.1.3.1-1 in REF4 is expressed as n-k, where k is the offset
and n is the subframe number for the uplink. For example,
for UL-DL configuration 0, the ACK/NAK transmitted on
subframe n=2 is in response to a PDSCH transmission k=6
subframes earlier (i.e., subframe 6 of the previous frame).
This relationship (for both TDD and FDD) between PDSCH
reception at the UE and the corresponding ACK/NAK
transmission allows high throughputs.

With the introduction of discovery for D2D, the relation-
ship between PDSCH reception and ACK/NAK transmis-
sion may need to be altered, because D2D direct discovery
resources and cellular resources can be multiplexed, with the
D2D discovery resources occupying either the UL or DL
band. Therefore, there is a need for ensuring that cellular and
D2D discovery subframes do not "collide." That is, cellular
transmission and D2D discovery transmission and/or recep-
tion may coincide in the same subframe. Such a coincidence is also referred to as a "collision" in this disclosure. Some
scenarios in which a collision between cellular and D2D
discovery transmissions is possible are listed below:

A discovery subframe coincides with a subframe where an
ACK/NAK is to be transmitted;

A discovery subframe coincides with a subframe where
control information (e.g., SR, CQI, etc.) is to be trans-
mitted;

A discovery subframe coincides with a subframe reserved
for semi-persistent scheduling (SPS) of the PUSCH;

A discovery subframe coincides with a subframe where an
ACK/NAK is to be transmitted due to hybrid automatic
repeat request (HARQ)-ACK;

A discovery subframe coincides with a subframe where
transmission time interval (TTI) bundling of PUSCH is
used;

A discovery subframe coincides with a subframe where
the PUSCH is scheduled;

A discovery subframe coincides with a subframe with
random access channel (RACH) enabled; and A discovery subframe coincides with a subframe with
sounding reference symbol (SRS).

To resolve these possible collision scenarios, the embodi-
ments disclosed herein permit the multiplexing of discovery
subframes while a UE is in the RRC-Connected or RRC-Idle
state. The disclosed embodiments further allow UEs without
D2D capabilities to communicate with UEs using D2D
functions.

In one embodiment, a priority or resource splitting
mechanism is provided in which the transmission of control
information is prioritized over discovery signals. That is, the
UE transmits its control information on the PUCCH instead
of receiving D2D discovery signals in a subframe designated
for D2D discovery. In this embodiment, resources for
PUCCH are distinct from the resources for D2D discovery.
For example, in a 50 resource block (RB) configuration for
the uplink, there can be six (6) RBs allocated for PUCCH
(such as RBs 0, 1, 2, 47, 48, and 49. The remaining RBs in
the subframe can be reserved for D2D discovery. With the
split of resources, transmissions for PUCCH and D2D
discovery do not overlap in frequency.

Likewise, when a device has an opportunity to transmit a
D2D discovery signal and control information (e.g., a
PUCCH containing an ACK/NACK in response to a
received DL data, with a fixed time relationship between the
received DL data and the corresponding PUCCH carrying
the ACK/NACK), the priority is such that the device trans-
mits control information instead of the D2D discovery
signal. Furthermore, according to another priority rule, if the
PUCCH does not convey the ACK/NAK, the UE can operate
in D2D discovery mode. In this embodiment, UEs without
D2D capabilities are permitted to send the PUCCH in a D2D
discovery subframe.

Another embodiment provides a priority rule between
D2D communications and D2D discovery. It is possible that
a subframe for D2D communication coincides with a D2D
discovery subframe. According to one priority rule, D2D
communications may have lower priority than D2D discov-
ery because the interference caused by D2D discovery
transmissions can corrupt D2D communications. For D2D
communications, acknowledgements may be generated for
data transmitted between devices in the D2D communica-
tions link. Accordingly, the ACK/NAK for the D2D com-
munication can be deferred until the next opportunity for
transmission of the D2D communication ACK/NAK.

In another embodiment, priority rules are established for
transmission and/or reception of D2D communications and transmission of a PUCCH in a subframe. According to one priority rule, if the control information on the PUCCH excludes the ACK/NAK, the UE may prioritize the D2D communications. According to another priority rule, in a subframe with both D2D communications and PUCCH, the UE gives priority for D2D communications over the PUCCH. The PUCCH can be deferred as described in another embodiment.

Another embodiment relates to subframes with RACH enabled. Since the RACH occupies six RBs, a D2D discovery configuration can avoid the RBs allocated for the RACH. For example, the RACH can use RBs 4-9, while the D2D discovery can avoid RBs 4-9 (and also can avoid RBs allocated for PUCCH). According to one priority rule, the D2D discovery has a higher priority than RACH transmission. For example, the UE can select to prioritize transmission of the D2D discovery over transmission of the RACH. However, a RACH due to a PDCCH order (see Section 5.3.3.1.3 of REF 5) or handoff can have a higher priority. According to a different priority rule, the RACH transmission has a higher priority than D2D discovery transmission or reception.

In another embodiment, the control information can be deferred to a subsequent subframe, e.g., the next uplink subframe. The delayed transmission of control information for subframe n may cause collisions on the PUCCH resources on subframe n+i (i=1 or greater for TDD). In order to avoid collisions, the resource mapping rule for the PUCCH is modified according to the equation:

$$n_{PUCCH} = n_{CCE} + N_{PUCCH}^{(1)},$$

where $n_{CCE}$ is a parameter associated with the location of the control channel element (CCE) of the physical downlink control channel (PDCCH) that provided the downlink control information (DCI) for the PDSCH, and $$N_{PUCCH}^{(1)}$$

is a parameter provided by higher layer signaling (e.g., RRC signaling). In one embodiment, another parameter $$\tilde{N}_{PUCCH}^{(1)}$$

can be assigned by RRC signaling (e.g. broadcasted in a SIB). When a subframe for transmission of control information (on the PUCCH) and a subframe for transmission or reception of discovery coincide, the control information is delayed and sent on PUCCH resources, as determined by the equation:

$$n_{PUCCH} = n_{CCE} + \tilde{N}_{PUCCH}^{(1)}.$$

Figure 6:
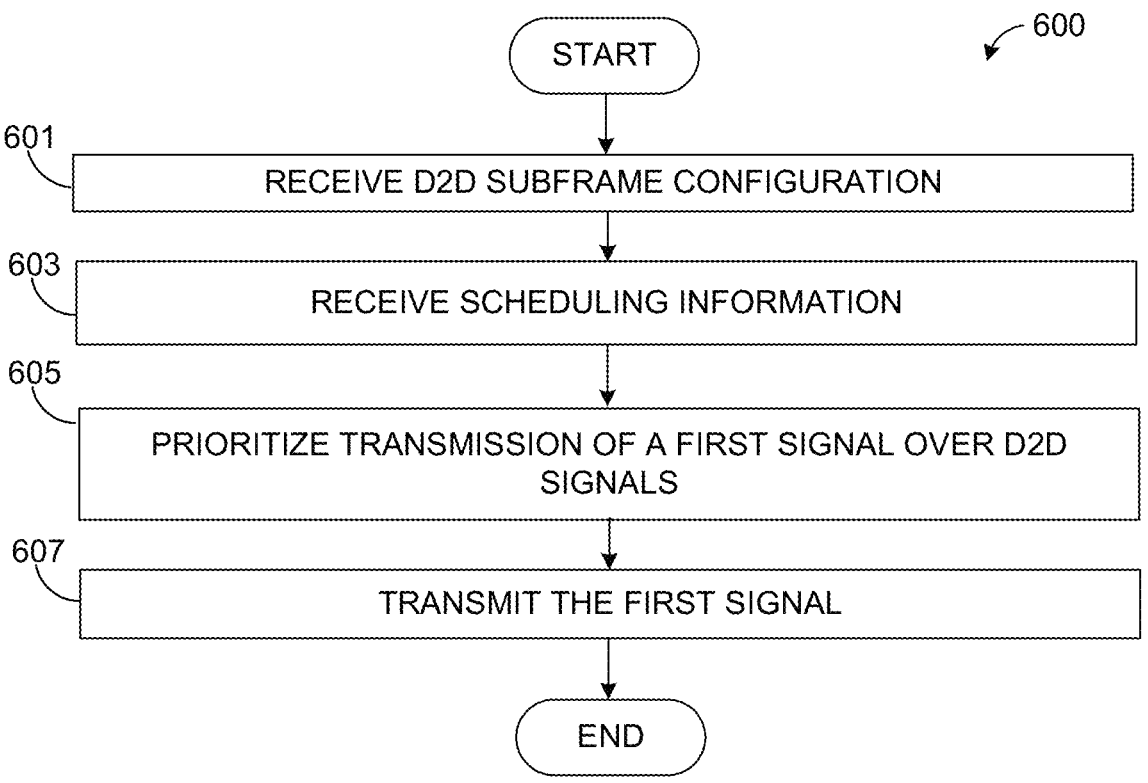
FIG. 6 illustrates an example method for avoiding collisions between D2D and cellular resources in accordance with this disclosure.

In another embodiment, in scenarios where transmission of SRS and discovery signals coincide, the SRS can be deferred to a later subframe, e.g., the next uplink subframe. FIG. 6 illustrates an example method for avoiding collisions between D2D and cellular resources in accordance with this disclosure. For ease of explanation, the method 600 is described as being used with the one of the UEs 110 in the system 100 of FIG. 1. However, the method 600 could be used by any suitable device and in any suitable system.

At step 601, a UE receives a D2D subframe configuration from a communications controller, such as an eNB. The D2D subframe configuration is for communication for one or more other wireless devices. The D2D subframe configuration indicates one or more subframes in which to transmit a D2D signal or receive one or more D2D signals. In some embodiments, the D2D signal is (or includes) a D2D discovery signal. Such a D2D discovery signal can be a Type 1 or a Type 2 discovery signal. In other embodiments, the D2D signal is (or includes) a D2D communication signal. In some embodiments, the D2D subframe configuration is received on a SIB.

At step 603, the UE receives, from the communications controller, scheduling information to transmit a first signal to the communications controller on a subframe indicated by the D2D subframe configuration. In some embodiments, the scheduling information includes a physical downlink control channel (PDCCH) order.

At step 605, the UE prioritizes the transmission of the first signal over a transmission of the D2D signal or a reception of the D2D signals. Then, at step 607, the UE transmits the first signal. Depending on embodiments, the first signal can include a RACH or a PUCCH.

Although FIG. 6 illustrates one example of a method 600 for avoiding collisions between D2D and cellular resources, various changes may be made to FIG. 6. For example, while shown as a series of steps, various steps in FIG. 6 could overlap, occur in parallel, occur in a different order, or occur any number of times.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

receiving, by a first user equipment (UE), a radio resource control (RRC) signaling from a communications controller, the RRC signaling indicating a first resource for communicating a device-to-device (D2D) signal between the first UE and a second UE;

receiving, by the first UE from the communications controller, scheduling information scheduling an uplink transmission of the UE over the first resource or a second resource that overlaps with the first resource in time domain;

determining, by the first UE, that the uplink transmission is prioritized over the D2D signal in accordance with a priority rule between D2D communications and uplink transmissions; and transmitting, by the UE based on the determination, the uplink transmission over the first resource or the second resource without transmitting or receiving the D2D signal over the first resource.

2. The method of claim 1, wherein the D2D signal comprises a D2D discovery signal.

3. The method of claim 1, wherein the D2D signal comprises a D2D communication signal.

4. The method of claim 1, wherein the uplink transmission comprises a random access channel (RACH) transmission.

5. The method of claim 1, wherein the uplink transmission comprises a physical uplink control channel (PUCCH) transmission.

6. A first user equipment (UE) comprising:

a processor; and a non-transitory computer readable storage medium storing programming for execution by the processor, the programming including instructions to cause the first UE to perform operations including:

receiving a radio resource control (RRC) signaling from a communications controller, the RRC signaling indicating a first resource for communicating a device-to-device (D2D) signal between the first UE and a second UE;

receiving, from the communications controller, scheduling information scheduling an uplink transmission of the UE over the first resource or a second resource that overlaps with the first resource in time domain;

determining that the uplink transmission is prioritized over the D2D signal in accordance with a priority rule between D2D communications and uplink transmissions; and transmitting, based on the determination, the uplink transmission over the first resource or the second resource without transmitting or receiving the D2D signal over the first resource.

7. The first UE of claim 6, wherein the D2D signal comprises a D2D discovery signal.

8. The first UE of claim 6, wherein the D2D signal comprises a D2D communication signal.

9. The first UE of claim 6, wherein the uplink transmission comprises a random access channel (RACH) transmission.

10. The first UE of claim 6, wherein the uplink transmission comprises a physical uplink control channel (PUCCH) transmission.

11. A non-transitory computer readable medium having a computer readable program code that, when executed by a processor of a first user equipment (UE), cause the first UE to perform operations including:

receiving a radio resource control (RRC) signaling from a communications controller, the RRC signaling indicating a first resource for communicating a device-to-device (D2D) signal between the first UE and a second UE;

receiving, from the communications controller, scheduling information scheduling an uplink transmission of the UE over the first resource or a second resource that overlaps with the first resource in time domain;

determining that the uplink transmission is prioritized over the D2D signal in accordance with a priority rule between D2D communications and uplink transmissions; and transmitting, based on the determination, the uplink transmission over the first resource or the second resource without transmitting or receiving the D2D signal over the first resource.

12. The non-transitory computer readable medium of claim 11, wherein the D2D signal comprises a D2D discovery signal.

13. The non-transitory computer readable medium of claim 11, wherein the D2D signal comprises a D2D communication signal.

14. The non-transitory computer readable medium of claim 11, wherein the uplink transmission comprises a random access channel (RACH) transmission.

15. The non-transitory computer readable medium of claim 11, wherein the uplink transmission comprises a physical uplink control channel (PUCCH) transmission.

* * * * *